United States Patent [19]
King et al.

[11] Patent Number: 6,027,082
[45] Date of Patent: Feb. 22, 2000

[54] CONVERTIBLE ELECTRIC UTILITY CROSS ARM INSULATOR UNIT

[75] Inventors: Nancy King; Halm King, both of Del Rio, Tex.

[73] Assignee: Cai Unit, Inc., Del Rio, Tex.

[21] Appl. No.: 09/185,396

[22] Filed: Nov. 3, 1998

[51] Int. Cl.[7] ................................................. F16L 3/22
[52] U.S. Cl. ........................ 248/68.1; 248/58; 248/65; 174/30; 174/40 R
[58] Field of Search .................................. 248/68.1, 512, 248/65, 58; 174/40 R, 42, 40 TD, 43, 44, 45 R, 209; 52/736.2, 737.2

[56] References Cited

U.S. PATENT DOCUMENTS

| | | | |
|---|---|---|---|
| 1,007,138 | 10/1911 | Peirce, Jr. ................................ | 248/68.1 |
| 1,030,574 | 6/1912 | Ette ........................................ | 248/68.1 |
| 1,239,142 | 9/1917 | Van Diest ................................ | 189/33 |
| 2,056,366 | 10/1936 | Richards et al. ........................ | 189/33 |
| 3,052,751 | 9/1962 | Volk et al. .............................. | 174/146 |
| 3,217,086 | 11/1965 | Taylor .................................... | 174/40 |
| 3,239,594 | 3/1966 | Bethea, Jr. .............................. | 174/40 |
| 3,254,151 | 5/1966 | Myers ..................................... | 174/40 |
| 3,739,077 | 6/1973 | Winkelman ............................. | 174/149 R |
| 3,803,345 | 4/1974 | Spaeth, Jr. .............................. | 174/149 R |
| 3,856,246 | 12/1974 | Sinko ..................................... | 248/68 CB |
| 4,682,747 | 7/1987 | King, Jr. et al. ......................... | 248/68.1 |
| 4,973,795 | 11/1990 | Sharpe .................................... | 174/40 R |
| 5,700,980 | 12/1997 | Bello et al. ............................. | 174/146 |
| 5,779,198 | 7/1998 | Rutherford et al. ..................... | 248/58 |

*Primary Examiner*—Anita W. King
*Assistant Examiner*—Debbie Short
*Attorney, Agent, or Firm*—Jackson Walker L.L.P.

[57] ABSTRACT

A utility cross arm assembly for supporting electrical wires from a utility pole. The entire assembly is constructed from insulative materials. It is provided with easily replaceable wire support members or protective caps to enhance convertibility from a single phase delivery configuration to a three phase delivery configuration. The assembly frame provides left and right cross arms with an upper support neck. Various arms and legs provide structural support and a way to mount the assembly to the utility pole. Large open spaces between the arms and legs provide a lightweight construction with low air resistance upon mounting to the utility pole.

11 Claims, 4 Drawing Sheets

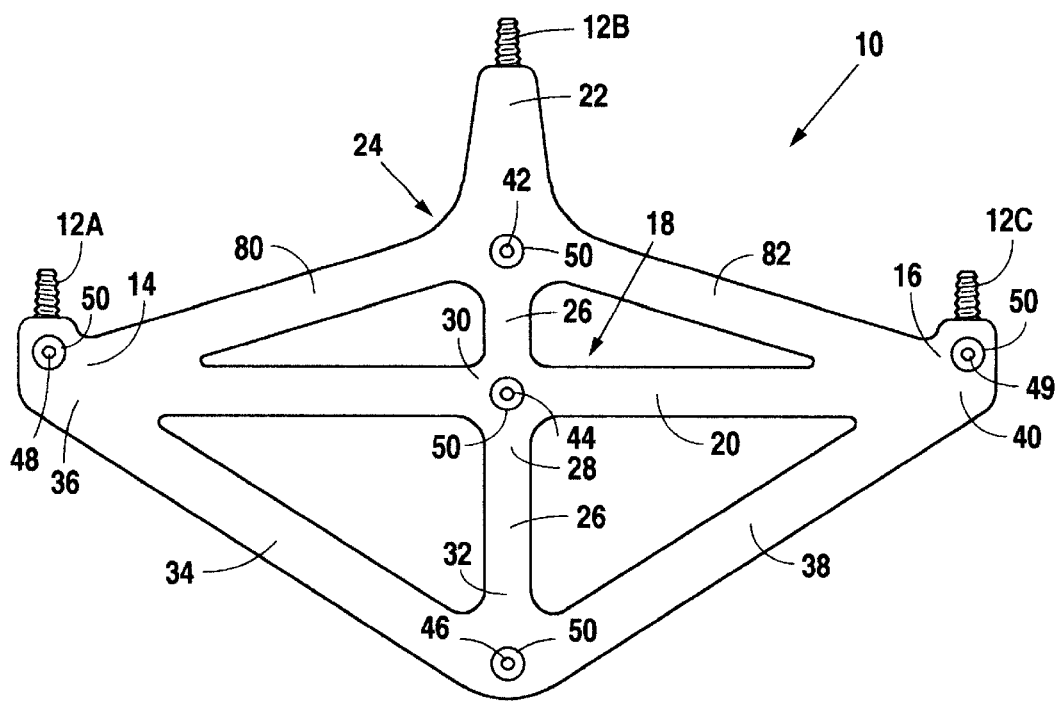
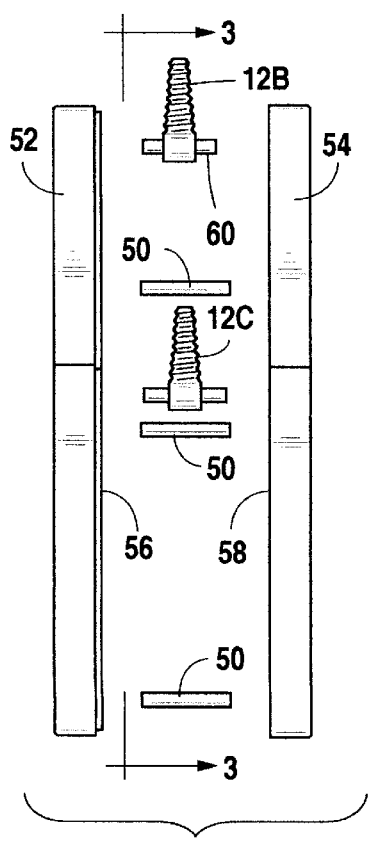
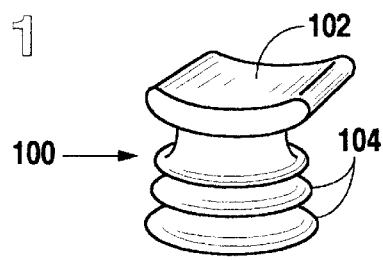
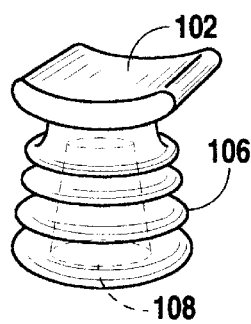
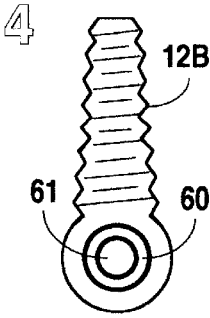
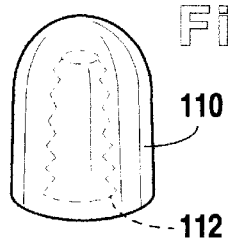

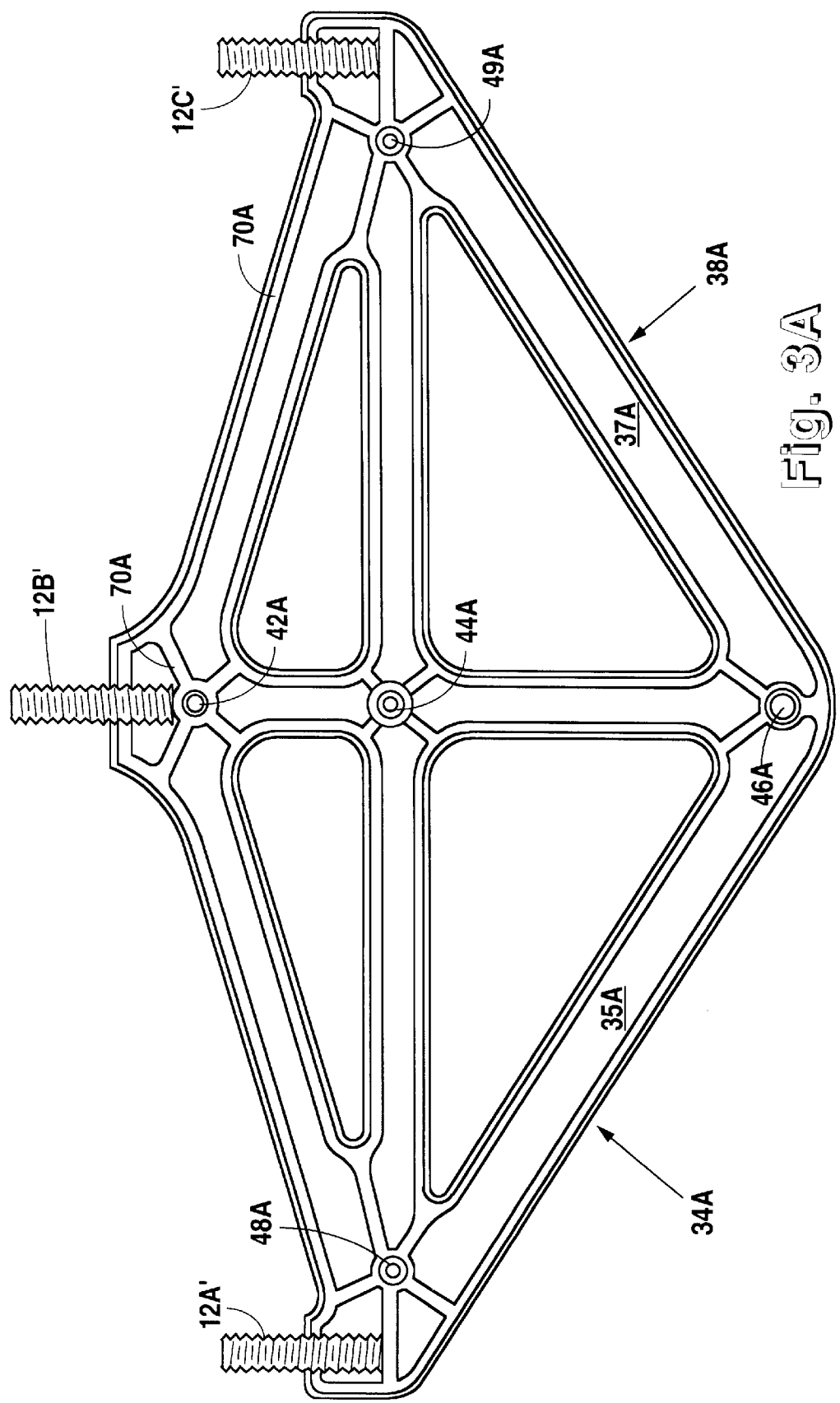

CONVERTIBLE ELECTRIC UTILITY CROSS ARM INSULATOR UNIT

BACKGROUND OF THE INVENTION

The present invention relates to an electric utility cross arm; and, more particularly, to an insulated unit which is easily convertible from single phase to three phase delivery. Further, the present invention provides a cross arm of simple, two-section, reinforced construction.

Power transmission lines are supported above ground to ensure isolation between the lines and the environment. While the most common arrangement for supporting such lines comprises a plurality of glass electrical insulators mounted on wooden cross arms attached to vertical wooden poles, U.S. Pat. No. 4,682,747 teaches the use of a modular power transmission support structure. This structure comprises a generally triangular central portion and two horizontal arms extending laterally from the base of the central triangular portion. The structural members of these cross arms comprise an outer shell formed of a polyester resin material and a plurality of alternating layers of polyester resin material and synthetic fabric contained within the shell. The inner core of each structural member contains a longitudinally extending metal bar or cable surrounded by a mixture of polyester resin and particulate matter. The present invention is a further improvement on this polyester resin, metal core structure. The elimination of the metal core and the substitution of reinforcing ribs reduces the weight of the assembly significantly and allows for the entire assembly to be of molded construction.

SUMMARY OF THE INVENTION

The present invention is a utility insulated cross arm assembly for supporting electrical wires from a utility pole. The assembly is constructed entirely from an insulative material. The assembly may be easily converted from a single phase to a three phase delivery configuration by replacing an internally threaded insulator cap with an internally threaded wire support member. Split frame sections having internal reinforcing ribs are joined to form a unitary frame having left and right horizontal cross arms with vertically extending threaded insulator pins adapted to receive an internally threaded cap or wire support member. An upper support neck is provided at the peak of the frame with an insulator pin. A horizontal support member, a central support leg, and two additional diagonal support legs provide support for the horizontal cross arms without the need for a metal core used in the prior art. Two upwardly diagonal support arms are attached to the upper support neck and the horizontal cross arms to complete a support arrangement for the entire frame.

BRIEF DESCRIPTION OF THE DRAWINGS

FIG. 1 is a front elevation view of the present invention without insulator members on the insulator pins.

FIG. 2 is an exploded side view of the present invention illustrating the split frame sections, the threaded pins with cylindrical bases and the adaptor sleeves.

FIG. 3A shows a view along line 3A—3A of FIG. 2A, illustrating the internal ribs of the back frame section.

FIG. 4 is a perspective view of a wire support member of the present invention with watershed rings.

FIG. 5 is a perspective view of a second size wire support member with watershed rings with the internal thread shown in broken lines.

FIG. 6 is a perspective view of an insulator cap of the present invention with internal threads shown in broken lines.

FIG. 7 illustrates a side view of an insulator pin with a cylindrical base member.

DETAILED DESCRIPTION OF THE PREFERRED EMBODIMENT

Figure 1A:
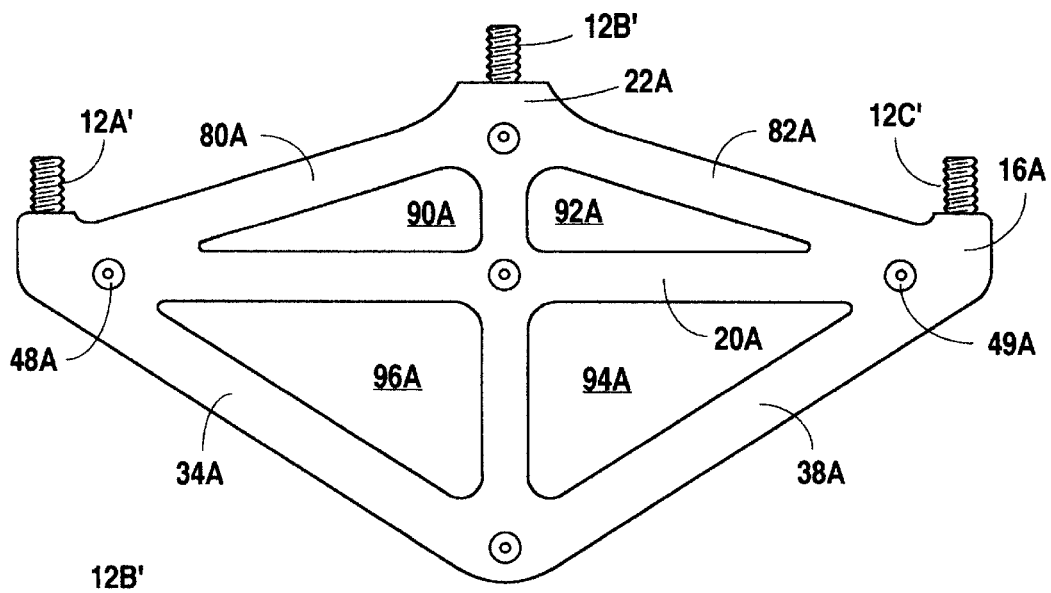
FIG. 1A is a front elevation view of an alternative embodiment of the present invention without insulator member on the insulator pins.

With reference now to the FIG and in particular to FIG. 1 and 1A, there is depicted a front elevation view of the convertible utility insulated cross arm assembly 10 without any insulator member on the vertically extending, taper-threaded insulator pins 12A, 12B, and 12C.

Left 14 and right 16 horizontal cross arms are integrally molded as part of the frame 18. A horizontal support member 20 connects end supports left 14 and right 16 cross arms.

An upper support neck 22 is integral with and located at a peak 24 of the frame 18. A central support leg 26 depends downwardly at a first end 28 from the mid-section 30 of the horizontal support member 20. From a second end 32 of the central support leg 26, a left diagonal support leg 34 extends upwardly to and connects with the distal end 36 of the left cross arm 14. Leg 34 provides strength to the frame 18 and particularly supports the left 14 cross arm when the cross arm is carrying the weight of the transmission wires (not shown). A right diagonal support leg 38 is also connected to the second end 32 of the central support leg 26. Leg 38 extends upwardly to and connects with the distal end 40 of the right cross arm 16 providing structural support for the right side of the frame.

A first upward diagonal support arm 80 extends from the distal end 36 of the left horizontal cross arm 14 to the upper support neck 22. A second upward diagonal support 82 likewise extends from the distal end 40 of the right horizontal cross arm 16 to the upper support neck 22.

The utility cross arm assembly 10 may be mounted to a utility pole by means of central holes 42, 44, and 46. In the preferred embodiments, fasteners (bolts) are inserted through these holes and then fastened to the utility pole. Mounting holes 48 and 49 may be used to attach a disconnect, bells for double deadend apparatuses, and lighting arrestors (not shown). A sleeve 50 may be inserted into the mounting holes to facilitate various sizes of fasteners.

Figure 2A:
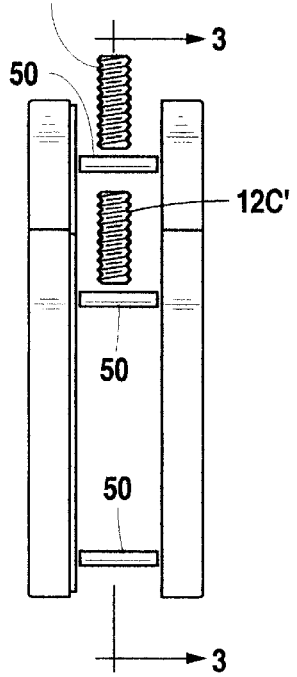
FIG. 2A is an exploded side view of an alternative embodiment of the present invention illustrating the it frame sections, threaded pins, and adaptor sleeves.

FIG. 2 illustrates the split frame sections 52 and 54. Front face section 52 and back frame section 54 are mirror images of one another, except that front section 52 has the tongue member 56 and back section 52 has the grooves 58. When assembled, appropriate adhesives are used to join the two frame sections.

Vertically extending taper-threaded insulator pins 12B and 12C with cylindrical base member 60 may be seen in FIGS. 2 and 7. A fastener receiving conduit 61 extends through the entire length of the base member 60. Conduit 61 aligns with openings 48 and 49 in the cross arms 14 and 16. Base member 60 is received into a cooperating space within the reinforced ribbing 70 internal to the frame sections 52 and 54 (see FIG. 3). The base member 60 may receive a sleeve insert 50 as appropriate.

Figure 3:
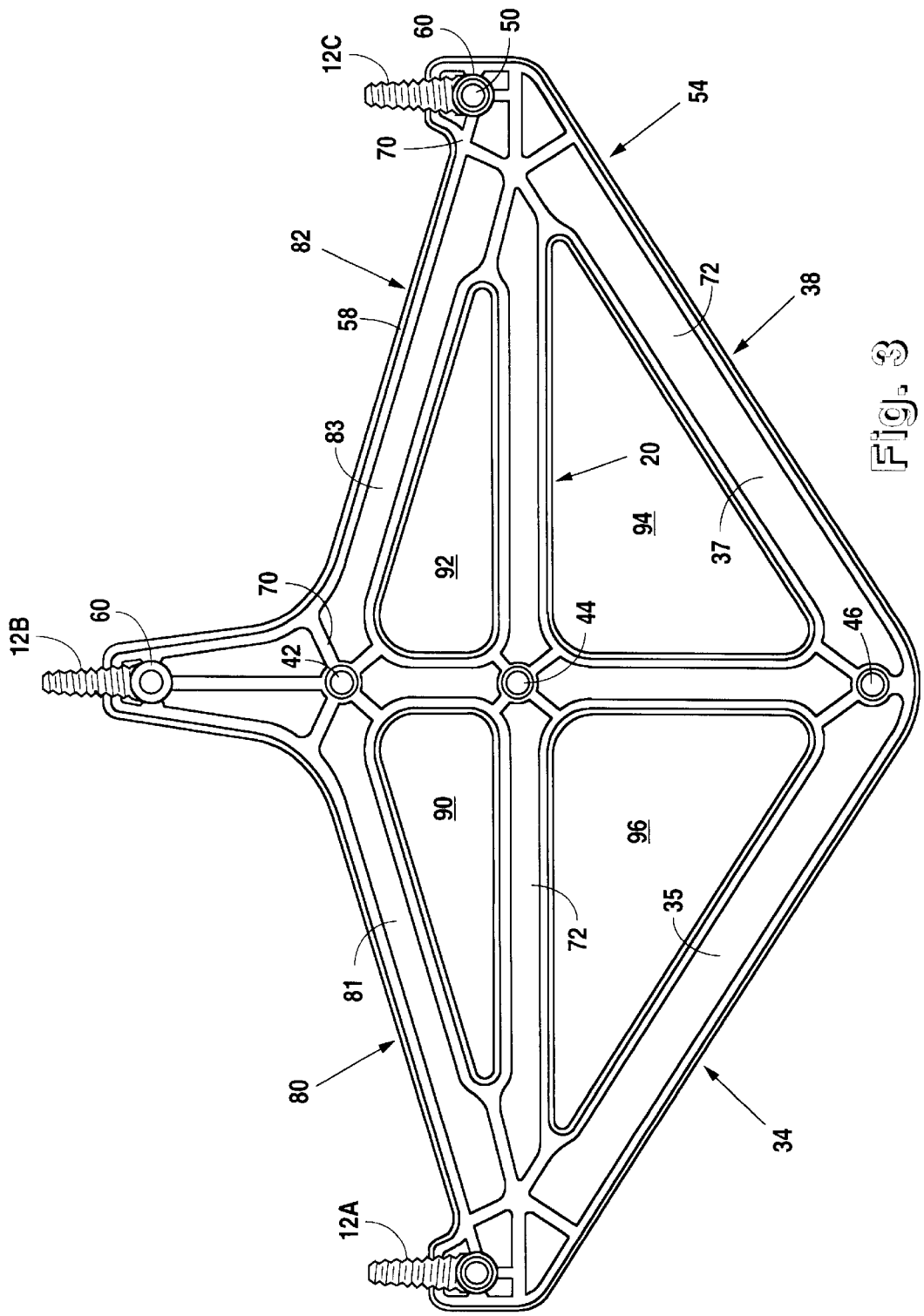
FIG. 3 show view along line 3—3 of FIG. 2, illustrating the internal ribs of the back frame section.

FIG. 3 illustrates the internal ribbing 70 within the back frame section 54. Again, the ribbing is mirror imaged in the face section. A groove 58 extends around the outside of the section 54 to accept the tongue 56 from the face section 52. Ribbing is provided to reinforce the frame and the mounting holes 42, 44, 46. The frame is constructed of compression molded fiberglass or sheet molding compound. A vinyl ester or polyvinyl ester resin may be used in combination with fiberglass. This provides a cross arm assembly which is entirely of insulated materials.

Hollow chambers 72 are formed between the ribbing 70 and yield a lightweight frame. Further, FIG. 3 shows that left 80 and right 82 upper diagonal support arms are spaced apart at a mid-section 81 and 83 from the horizontal support member 20. This creates two open spaces 90 and 92 in the frame resulting in a lighter weight and reduced wind resistance once the unit is mounted on the utility pole.

In a similar way left 34 and right 38 diagonal support legs are also spaced apart at a mid-section 35 and 37 from the horizontal support member 20. This creates two additional open spaces 94 and 96 in the frame.

Figure 4A:
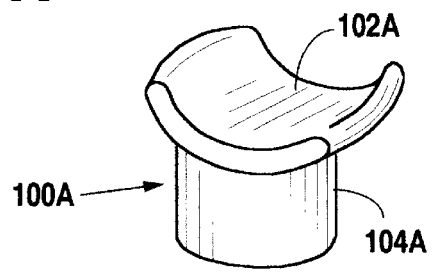
FIG. 4A is a perspective view of an alternative wire support member embodiment of the present invention
Figure 5A:
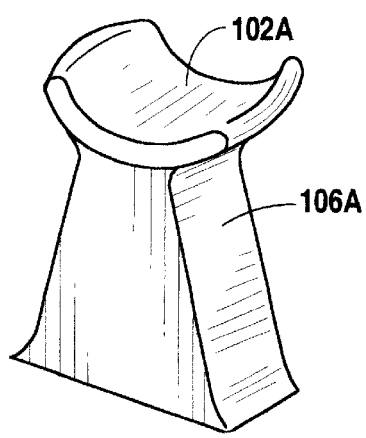
FIG. 5A is a perspective view of a second size wire support member alternative embodiment of the present invention with internal threads shown in broken lines.
Figure 6A:
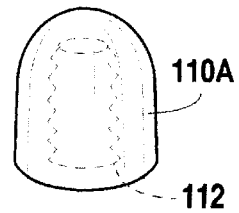
FIG. 6A is a perspective view of an alternative insulator cap of the present invention with internal threads shown in broken lines.

FIG. 4 illustrates a wire support member 100 having a wire trough 102 and watershed rings 104. The wire support member has an internally threaded hole so that it may be mounted onto insulator pins 12A, 12B, or 12C. FIG. 5 shows a larger sized wire support member 106 with the internally threaded hole 108 shown in broken lines. FIG. 6 shows an insulator protective cap 110 with threaded hole 112 in broken lines.

By the appropriate arrangement of insulator members 100, 106, and 110, the present invention enables the user to connect from single phase delivery to three phase delivery without having to completely rebuild the entire cross arm structure. In a single phase configuration two of the insulator pins are provided with wire support members 100 and 106 and the third pin is provided with a protective cap 110. In a three phase configuration all pins are provided with wire support members.

To convert from one configuration to another merely requires the user to remove a threaded cap and replace it with a threaded wire support member. In geographical regions where increased electrical utility demands are occurring the present invention considerably reduces the labor and cost to upgrade a system.

FIGS. 1A, 2A, 3A, 4A, 5A, and 6A illustrate an alternative embodiment of the present invention. As FIG. 1A shows the upper neck support is shorter and mounting holes 48A and 49A are moved inwardly along horizontal support arm. Pins 12A, 12B, and 12C are not tapered but are generally cylindrical threaded pins. The pins do not have the cylindrical base member 60 as is found with pins 12A, 12B, or 12C.

However, the structural arrangement of the arms 80A, 82A, and 20A and the legs 34A and 38A are essentially the same as those described in the first embodiment above. The insulators 100A, 106A, and 10A have the same functions as those described above.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

We claim:

1. A utility insulated cross arm for supporting electrical wires from a utility pole constructed entirely from an insulative material comprising:

a frame having a first face section and a second back section, said sections each having internal reinforcing ribs, said ribs of said first face section being a mirror image of said ribs of said second back section;

left and right horizontal cross arms integral with said frame, each of said cross arms having a vertically extending threaded insulator pin adapted to receive an internally threaded insulator member, said horizontal cross arms connected and supported by a horizontal support member;

an upper support neck integral with and located at a peak of said frame, said upper support neck having a vertically extending threaded insulator pin adapted to receive an internally threaded insulator member;

a central support leg downwardly depending at a first end from a mid-section of said horizontal support member;

a left diagonal support leg extending from a second end of said central support leg to a distal end of said left horizontal cross arm;

a right diagonal support leg extending from said second end of said central support leg to a distal end of said right cross arm; and mounting means for mounting said frame to said utility pole with a first size fastener.

2. The cross arm of claim 1 wherein said insulator member to be received on said left and right horizontal cross arm is a wire support member and said insulator member to be received on said upper support neck is an insulator cap, said electrical wires supportable by said wire support members in a single phase delivery configuration.

3. The cross arm of claim 1 wherein all insulator members are wire support members, said electrical wires supportable by said wire support members in a three phase delivery configuration.

4. The cross arm of claim 1 wherein said mounting means further comprises adaptor sleeves to accommodate an alternative size fastener.

5. The cross arm of claim 1 wherein each of said vertically extending threaded insulator pins further comprise a cylindrical base member adapted to fit into and cooperate with openings in said ribs within said frame to interchangeably secure said pins within said frame.

6. The cross arm of claim 5 wherein said cylindrical base member further comprises a fastener receiving conduit extending through the entire length of said base member, said conduit aligning with openings in said mounting means for mounting said frame to said utility pole.

7. The cross arm of claim 6 wherein said mounting means further comprises adaptor sleeves to accommodate an alternative size fastener.

8. The cross arm of claim 1 further comprising a first upward diagonal support arm extending from said distal end of said left horizontal cross arm to said upper support neck; and a second upward diagonal support arm extending from said distal end of said right horizontal cross arm to said upper support neck.

9. The cross arm of claim 8 wherein said first and second upward diagonal support arms spaced apart at a mid-section from said horizontal support member; and, left and right diagonal support legs spaced apart at a mid-section from said horizontal support member.

10. A utility insulated cross arm for supporting electrical wires from a utility pole constructed entirely from an insulative material comprising:

a frame having a first face section and a second back section, said sections each having internal reinforcing ribs, said ribs of said first face section being a mirror image of said ribs of said second back section;

left and right horizontal cross arms integral with said frame, each of said cross arms having a vertically extending threaded insulator pin adapted to receive an internally threaded wire support member, said electrical wires supportable by said wire support members in a single phase delivery configuration, said horizontal cross arms connected and supported by a horizontal support member;

each of said vertically extending threaded insulator pins further comprises a cylindrical base member adapted to fit into and cooperate with openings in said ribs within said frame to interchangeably secure said pins within said frame;

said cylindrical base member further comprises a fastener receiving conduit extending through the entire length of said base member, said conduit aligning with openings in said mounting means for mounting said frame to said utility pole;

an upper support neck integral with and located at a peak of said frame, said upper support neck having a vertically extending threaded insulator pin adapted to receive an internally threaded insulator cap;

a central support leg downwardly depending at a first end from a mid-section of said horizontal support member;

a left diagonal support leg extending from a second end of said central support leg to a distal end of said left horizontal cross arm;

a right diagonal support leg extending from said second end of said central support leg to a distal end of said right cross arm;

a first upward diagonal support arm extending from said distal end of said left horizontal cross arm to said upper support neck; and a second upward diagonal support arm extending from said distal end of said right horizontal cross arm to said upper support neck;

said first and second upward diagonal support arms spaced apart at a mid-section from said horizontal support member; and, left and right diagonal support legs spaced apart at a mid-section from said horizontal support member; and mounting means for mounting said frame to said utility pole with a first size fastener, said mounting means further comprises adaptor sleeves to accommodate an alternative size fastener.

11. A utility insulated cross arm for supporting electrical wires from a utility pole constructed entirely from an insulative material comprising:

a frame having a first face section and a second back section, said sections each having internal reinforcing ribs, said ribs of said first face section being a mirror image of said ribs of said second back section;

left and right horizontal cross arms integral with said frame, each of said cross arms having a vertically extending threaded insulator pin adapted to receive an internally threaded wire support member, said horizontal cross arms connected and supported by a horizontal support member;

each of said vertically extending threaded insulator pins further comprises a cylindrical base member adapted to fit into and cooperate with openings in said ribs within said frame to interchangeably secure said pins within said frame;

said cylindrical base member further comprises a fastener receiving conduit extending through the entire length of said base member, said conduit aligning with openings in said mounting means for mounting said frame to said utility pole;

an upper support neck integral with and located at a peak of said frame, said upper support neck having a vertically extending threaded insulator pin adapted to receive an internally threaded wire support member, said electrical wires supportable by said wire support members in a three phase delivery configuration;

a central support leg downwardly depending at a first end from a mid-section of said horizontal support member;

a left diagonal support leg extending from a second end of said central support leg to a distal end of said left horizontal cross arm;

a right diagonal support leg extending from said second end of said central support leg to a distal end of said right cross arm;

a first upward diagonal support arm extending from said distal end of said left horizontal cross arm to said upper support neck; and a second upward diagonal support arm extending from said distal end of said right horizontal cross arm to said upper support neck;

said first and second upward diagonal support arms spaced apart at a mid-section from said horizontal support member; and, left and right diagonal support legs spaced apart at a mid-section from said horizontal support member; and mounting means for mounting said frame to said utility pole with a first size fastener, said mounting means further comprises adaptor sleeves to accommodate an alternative size fastener.

* * * * *